United States Patent
Swift

(10) Patent No.: US 11,701,846 B2
(45) Date of Patent: Jul. 18, 2023

(54) METHODS OF SEALING WET SURFACES BY APPLYING MOISTURE-CURE HYBRID SYNTHETIC RESIN PASTE

(71) Applicant: Swift IP, LLC, Weston, FL (US)

(72) Inventor: Philip Swift, Weston, FL (US)

(73) Assignee: Swift IP, LLC, Weston, FL (US)

(*) Notice: Subject to any disclaimer, the term of this patent is extended or adjusted under 35 U.S.C. 154(b) by 127 days.

(21) Appl. No.: 16/713,083

(22) Filed: Dec. 13, 2019

(65) Prior Publication Data

US 2021/0178429 A1  Jun. 17, 2021

(51) Int. Cl.
| | | |
|---|---|---|
| *B29C 73/02* | (2006.01) | |
| *B05D 7/06* | (2006.01) | |
| *E04H 4/00* | (2006.01) | |
| *F16L 55/162* | (2006.01) | |
| *C09K 3/12* | (2006.01) | |

(52) U.S. Cl.
CPC ............... *B29C 73/02* (2013.01); *B05D 7/06* (2013.01); *E04H 4/00* (2013.01); *F16L 55/162* (2013.01); *C09K 3/12* (2013.01)

(58) Field of Classification Search
None
See application file for complete search history.

(56) References Cited

U.S. PATENT DOCUMENTS

| | | | | |
|---|---|---|---|---|
| 3,975,558 A | * | 8/1976 | Speer | C14B 7/04 427/140 |
| 4,195,001 A | * | 3/1980 | Lytton | C09J 163/00 523/466 |
| 4,281,794 A | * | 8/1981 | Dimino | B05B 17/08 239/20 |
| 4,758,295 A | * | 7/1988 | Sawaide | C08G 18/10 156/98 |
| 5,348,801 A | | 9/1994 | Venzi et al. | |
| 5,763,070 A | * | 6/1998 | Kerlek | E01C 11/24 427/302 |
| 5,894,864 A | | 4/1999 | Rich | |
| 10,259,008 B1 | | 4/2019 | Swift et al. | |
| 2004/0211139 A1 | * | 10/2004 | Peng | E04F 13/08 52/393 |
| 2006/0118230 A1 | * | 6/2006 | Eisenhut | B29C 73/02 156/94 |

(Continued)

FOREIGN PATENT DOCUMENTS

| | | | |
|---|---|---|---|
| CN | 106366634 A | * | 2/2017 |
| CN | 106366634 B | | 1/2019 |

(Continued)

OTHER PUBLICATIONS

Tobias. "Which is the Best Piping Material for Plumbing Installations" (2018). Retrieved from https://www.ny-engineers.com (Year: 2018).*

(Continued)

*Primary Examiner* — Jose I Hernandez-Kenney
(74) *Attorney, Agent, or Firm* — Banner & Witcoff, Ltd.

(57) ABSTRACT

A moisture-cure, hybrid synthetic resin paste may be applied over an aperture formed in a wet surface to cover the aperture and form a waterproof barrier. In some examples, water may be flowing or even gushing through the aperture at the time that the paste is applied. The paste may be applied using a suitable hand tool such as a spatula.

13 Claims, 4 Drawing Sheets

(56) References Cited

U.S. PATENT DOCUMENTS

2018/0023747 A1\* 1/2018 Hutt .................... F16L 55/1686
137/15.08

FOREIGN PATENT DOCUMENTS

| FR | 2947753 A1 | \* | 1/2011 | ............... | B27H 5/08 |
| FR | 2947753 A1 | | 1/2011 | | |
| GB | 2424898 A | \* | 10/2006 | ............ | C08G 77/04 |
| JP | 07197551 A | \* | 8/1995 | | |
| JP | H07197551 A | | 8/1995 | | |
| JP | 07305343 A | \* | 11/1995 | ............... | B27H 5/08 |
| JP | 07305343 A | | 11/1995 | | |
| JP | 2003176699 A | \* | 6/2003 | | |
| JP | 2003176699 A | | 6/2003 | | |
| JP | 2015189877 A | \* | 11/2015 | | |
| JP | 2015189877 A | | 11/2015 | | |

OTHER PUBLICATIONS

Fluid Sealing Service, "Tapes: Pressure and Butyl," pp. 1-2. Archived Aug. 18, 2012. Retrieved at https://web.archive.org/web/20120818001655/http://www.fluidsealingservice.com/Tapes%20Pressure%20and%20Butyl.htm (Year 2012).

Pool Leak Pros, "Leak Detection Process," p. 1. Archived Aug. 11, 2015. Retrieved at https://web.archive.org/web/20150811000002/http://www.poolleakpros.com/leak-detection-process-html (Year: 2014).

The Great Outdoors, "Safety—How do you patch/repair an inflatable dinghy while still underway?," pp. 1-2. Cited passages published May 27-28, 2016. Retrieved at https://outdoors.stackexchange.com/questions/11859/how-do-you-patch-repair-an-inflatable-dinghy-while-still-underway (Year: 2016).

The Hull Truth, "Do you carry emergency hull repair materials", pp. 1, 7. Cited passages published Mar. 25-26, 2014. Retrieed at https://www.thehulltruth.com/northeast/576631-do-you-carry-emergency-hull-repair-materials.html (Year: 2014).

Technical Data Sheet "ASI 9200 STP Hybrid Sealant/Adhesive," (American Sealants, Inc.).

Technical Data Sheet, OSI Tougher than the Elements, "Window, Door & Siding Sealant QUAD® MAX, stretches 5X," Revision: Jul. 25, 2018, supersedes: Jun. 20, 2018, Ref. #:477545, 584166, 5 pages.

DAP Technical Data Sheet, "DAP® 3.0™ High Performance Window, Door, Siding & Trim Sealant," (Jul. 24, 2019), 4 pages.

Mar. 24, 2021—(WO) ISR and Wo—App. No. PCT/US20/64437.

In The Swim, "Leaking Pool: Find and Fix Pool Leaks" p. 3, twelfth paragraph: p. 4, (third paragraph); p. 5, seventh paragraph, a blog, https://blog.intheswim.com/pool-leaks-how-to-fin-them-and-fix-them/. Jun. 14, 2018 entire document.

\* cited by examiner

METHODS OF SEALING WET SURFACES BY APPLYING MOISTURE-CURE HYBRID SYNTHETIC RESIN PASTE

BACKGROUND

A number of products are commercially available for waterproofing doors, windows, siding, and various other structures. Acrylic- and solvent-based products typically require application onto a dry surface in order to provide sufficient adhesion to the surface and resulting waterproofing. However, in some circumstances, damage to a surface may be discovered only upon the presence of water on the surface and, in severe cases, upon significant quantities of water flowing through the damaged area. It would be desirable to develop techniques that allow for repair of wet surfaces, including surfaces from which water is actively flowing. It would be particularly desirable to develop techniques that also allow for the surface to be painted subsequent to the repair.

SUMMARY

Aspects of the invention involve techniques in which a moisture-cure, hybrid synthetic resin paste (herein sometimes referred to as "paste") is applied to a wet surface to create a waterproof barrier. The paste may be applied to a wide variety of surfaces, non-limiting examples of which include metal, wood, stucco, plaster, brick, concrete, glass, rubber, tile, fiberglass, ceramic, porcelain, plastic, canvas, stone, and drywall. The paste may be used to repair, patch, bond, seal, and/or waterproof various types of articles, non-limiting examples of which include roofs, gutters, boats, kayaks, personal watercraft, canoes, rafts, outdoor equipment, mobile homes, recreational vehicles, campers, garden hoses, low-pressure PVC and plumbing pipes, tents, vinyl awnings, covers and tarps, above-ground swimming pools, windows, doors, walls, seams, vents, air ducts, HVAC systems, and the like.

In one aspect, an aperture is formed in wooden barrel that is at least partially filled with water by cutting through a wall portion thereof, e.g., a side or an end portion of the barrel, using a cutting tool such as a chainsaw. The water that gushes through the aperture may be collected in a reservoir and recirculated into the barrel via a pump to maintain the water in the barrel at a substantially constant level. As the water gushes through the aperture, a quantity of paste is applied to cover the aperture and form a watertight seal, thereby preventing water from continuing to flow through the aperture.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Figure 1A:
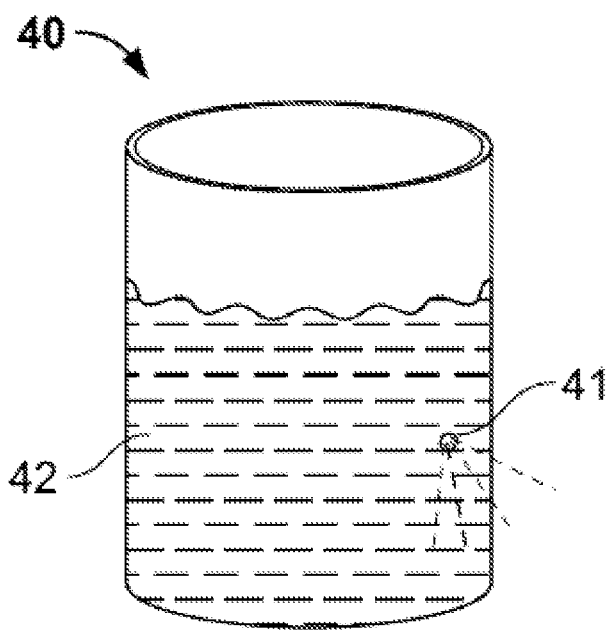
FIGS. 1A and 1B illustrate a method of repairing a leak in a liquid container such as a wooden barrel or other liquid storage tank.

A moisture-cure, hybrid synthetic resin paste (sometimes referred to herein as "paste") may be used in a variety of techniques involving repair or waterproofing of various articles such as roofs, gutters, boats, kayaks, personal watercraft, canoes, rafts, outdoor equipment, mobile homes, recreational vehicles, campers, garden hoses, low pressure PVC and plumbing pipes, tents, vinyl awnings, covers and tarps, above-ground swimming pools, windows, doors, walls, seams, vents, air ducts, HVAC systems, and the like. The paste is highly flexible, allowing it to readily conform to the shape of the surface to which it is applied. The paste may form a strong bond with a variety of surfaces under a variety of conditions, particularly in the presence of water. The paste may be applied to a wide variety of surfaces, non-limiting examples of which include metal, wood, stucco, plaster, brick, concrete, glass, rubber, tile, fiberglass, ceramic, plastic, porcelain, canvas, stone, and drywall.

In some examples, the paste is applied to a surface that is wet and/or in contact with flowing water, so that leaks may be repaired in articles such as pipes, aquariums, above-ground swimming pools, hot tubs, or inflatable pools, for example, without the need for draining them prior to repair, as well as in doors, windows, or other building structures that may be leaking water during a storm and/or as a result of flooding. The methods described herein also are useful to affect underwater repairs such as repairing leaks in waterborne vessels, docks, or the like.

Any suitable application tool may be used to apply the paste. For example, the paste may be supplied in a caulk tube and applied using a caulk gun. In some examples, the paste may be applied with a suitable hand tool such as a spatula. Application of the paste by spatula not only allows for precise control of the quantity of paste applied, but also enables the user to, simultaneous with application, force the paste into crevasses and damaged areas as the paste is applied, further assisting with the formation of a watertight seal.

In some examples, a paste is applied to a wet surface for purposes of waterproofing, including repairing holes or leaks in an article, or modifying the article to make it waterproof by covering preformed holes or by adding a moisture-impermeable layer to the article or a portion thereof. The paste may provide a durable, breathable, weatherproof barrier that is resistant to rain, snow, sun, wind, air moisture, UV degradation, and natural weathering over a wide temperature range. The paste may provide additional strength and waterproofing that enable a much wider range of applications than heretofore were possible, particularly applications needing higher adhesive strength and/or when the paste is applied to a surface in the presence of water, including flowing water and even gushing water. A "wet surface," as used herein, refers to a surface which has retained water due to weather and/or contact with water such as a body of water including flood water, ponds, rivers, lakes, streams, oceans, or the like. For clarity, water that is present merely to a hygroscopic material, such as wood, absorbing moisture from the air does not constitute a "wet" surface. Wet surfaces may be identified by the presence of water being discernible by the naked human eye using only ambient light.

The particular composition of the moisture-cure, hybrid synthetic resin paste used is not limited provided that it has sufficiently high adhesive strength and water-resistance characteristics. The paste may have a non-shrink formula. Moisture-cure polyurethanes (PURs) or polyurethane prepolymer are isocyanate-terminated prepolymers that are formulated to cure with ambient water. Cured PURs are segmented copolymer polyurethane-ureas exhibiting microphase-separated morphologies. One phase is derived from a typically flexible (sub-ambient glass transition temperature, $T_g$) polyol that is generally referred to as the soft phase. The corresponding hard phase is born from the di- or polyisocyanates that through water reaction produce a highly cross-linked material with softening temperature well above room temperature.

Moisture-cure polyurethanes have been widely used in the adhesive and coating industries. Thermal, mechanical, and surface properties of hyperbranched polyurethane-urea (HBPU) moisture cured coatings have been studied in relationship to chemical structure. Different NCO terminated HBPU prepolymers were prepared by reacting hyperbranched polymers with isophorone diisocyanate (IPDI) or 4,4'-bis-methylene cyclohexane diisocyanate (HMDI). A range of NCO/OH eq. ratios from 1.2-1.6 may be used. Thermal and mechanical properties of moisture cured polyurethane-urea/clay nanocomposite coatings have been studied in relationship to clay dispersion and intercalation of clay platelets in the urethane-urea matrix. Coatings were prepared by moisture curing of IPDI capped hydroxyl terminated polybutadiene/clay dispersions in a relative humidity (RH) of 50% at 25° C. Moisture cured polyurethane-urea coatings have been made by reacting 1,2,3-triazole rich polyether polyols with HMDI at NCO/OH eq. ratio of 1.2 to obtain isocyanate-terminated polyurethane prepolymers. The prepolymers were cured under atmospheric moisture to make polyurethane-urea free films.

In some examples, the composition may be free of solvents and isocyanates, and have excellent long-term resistance to UV and weathering, making it useful for both interior and exterior applications. Some compositions may not work well with certain olefin class plastics or in applications with pressure in excess of 20 psi, such as garden hoses. Non-limiting examples of commercial products that may be used include DAP® 3.0 sealant, an advanced hybrid polymer-based product available from DAP Products Inc., and OSI® QUAD® MAX, a silane modified polymer-based product available from Henkel Corporation. According to its safety data sheet, QUAD® MAX includes 50-60 wt. % limestone (CAS 1317-65-3), 5-10 wt. % phthalic acid, di(C9-11)alkylester, branched, C10-rich (CAS 68515-49-1), 1-5 wt. % trimethoxyvinylsilane (CAS 2768-02-7), and 0.1-1 wt. % quartz ($SiO_2$) (CAS 14808-60-7).

If desired, the paste may be formulated in a variety of colors tailored to particular applications or consumer preferences. For example, paste compositions may be clear, white, off-white, black, gray, blue, green, red, almond, brown, silver, yellow, terra cotta, or other suitable color. The selection of appropriate pigment(s) or other colorant(s) needed to achieve a desired color will be apparent to persons skilled in the art with the aid of no more than routine experimentation. Alternatively, the paste may be painted after application, e.g., subsequent to curing. In some examples, the cured paste may be sanded prior to painting.

Figure 1B:
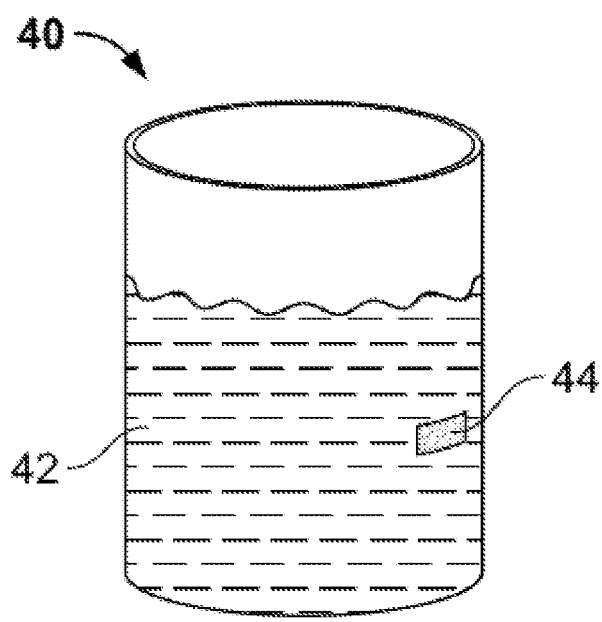

FIGS. 1A and 1B illustrate the repair of a leak in a liquid container 40, e.g., a 5- or 10-gallon bucket, 55-gallon drum, or large storage tank. The container 40 contains water 42 or other liquid, which is discharged through aperture 41. The aperture 41 may be circular, as shown in FIG. 1A, or may be of various other shapes such as an elongated gash, for example, or may be irregularly shaped depending on the source of damage to the container. For example, a circular hole 41 may have an approximately 1" diameter. While water 42 discharges through the aperture 41, a quantity of paste 44 may be applied to the container so as to cover the aperture 41. The quantity of paste 44 may be selected so that the aperture 41 is completely covered as well as a sufficiently large area surrounding the aperture 41 to allows a watertight seal to be created. By way of example, the surface area of the applied paste 44 may be about 200% or more of the surface area of the aperture 41. As shown in FIG. 1B, after its application the paste 44 is effective to prevent further discharge of water through the aperture 41.

In one example, the container 40 may be a wooden barrel or portion thereof. The aperture 41 may be formed by cutting through a wall portion of the wooden barrel, e.g., a side or an end portion of the barrel, using a suitable cutting tool such as a chainsaw (not illustrated). The water that gushes through the aperture 41 may be collected in a reservoir (not illustrated) and then recirculated into the container 40 via a suitable pump (not illustrated) to replenish the water, e.g., to maintain the water in the container 40 at a constant or substantially constant level. As the water 42 gushes through the aperture 41, a quantity of paste 44 is applied to the container so as to cover the aperture 41 and form a watertight seal, thereby preventing water from further discharging through the aperture 41.

Figure 2A:
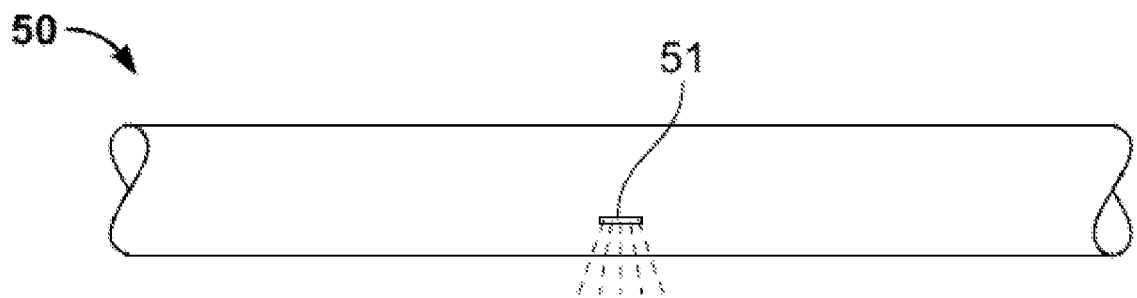
FIGS. 2A and 2B illustrate a method of repairing a leak in a conduit such as a PVC pipe.
Figure 2B:
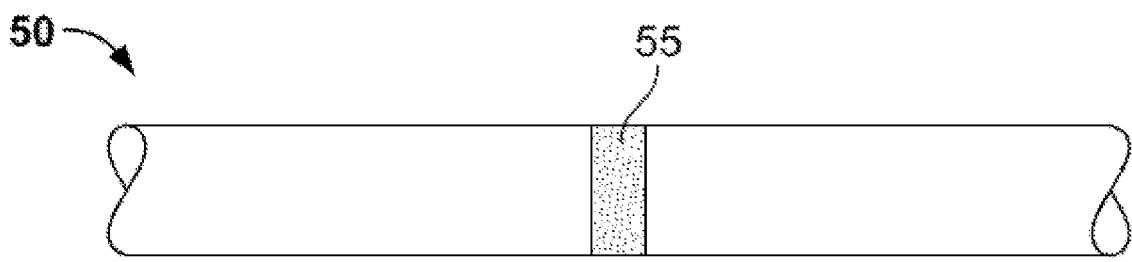

FIGS. 2A and 2B schematically illustrate the repair of a conduit 50 such as a PVC pipe, garden hose, pool or hot tub filter hose, or the like. The conduit 50 has an aperture 51 therein through which water or other liquid is discharged, as shown in FIG. 2A. While water is being discharged through the aperture, a quantity of paste 55 is applied to the conduit 50 to cover the aperture 51 and create a watertight seal. The quantity of paste 55 may be appropriately selected depending on the size and shape of the aperture 51. As described above in connection with the embodiment of FIGS. 1A and 1B and as illustrated in FIG. 2B, it may be advantageous to apply the paste 55 over an area significantly larger (e.g., 200% or more) than that of the aperture 51 in order to form a watertight seal, thereby preventing further discharge of water through the aperture 51.

Figure 3A:
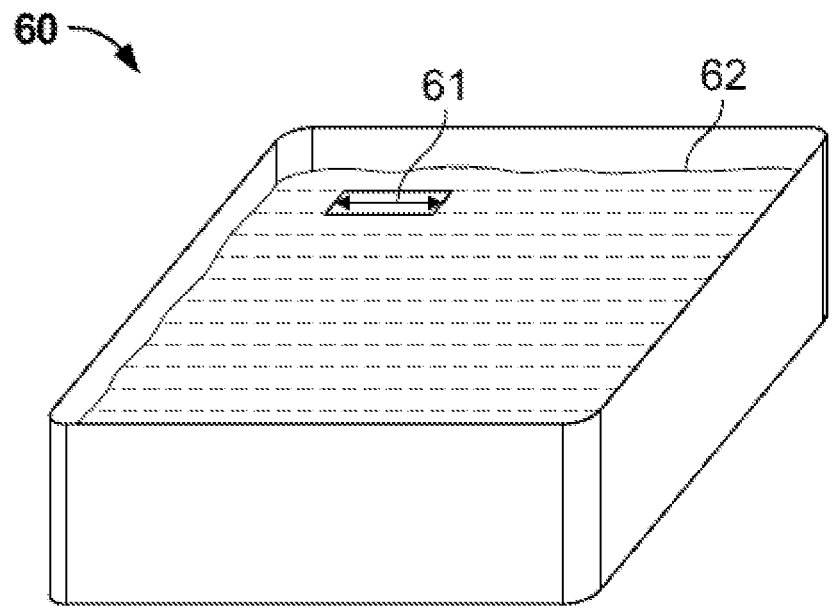
FIGS. 3A and 3B illustrate a method of repairing a leak in a water-containing structure such as an above-ground swimming pool.
Figure 3B:
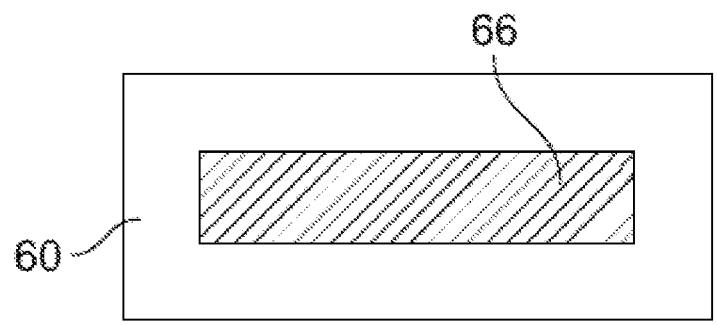

FIGS. 3A and 3B schematically illustrate a method of repairing a leak in a water-containing structure 60 such as an above-ground swimming pool, hot tub, or aquarium. An aperture 61 that exists below the water level 62 may be repaired by applying a quantity of paste 66 over the aperture 61 to create a watertight seal. The paste 66 may be applied to the inside surface of the structure 60 even though the aperture 61 is surrounded by water. Thus, it is not necessary to drain the water from the structure 60 before making the repair. The quantity of the paste 66 should be selected so that the aperture 61 is completely covered as well as a sufficient area surrounding the aperture 61, as discussed above in connection with previous examples, to allow formation of a watertight seal. If desired, another quantity of paste (not illustrated) may be applied to the outside surface of the structure 60 covering the aperture 61 to reinforce the watertight seal.

Figure 4A:
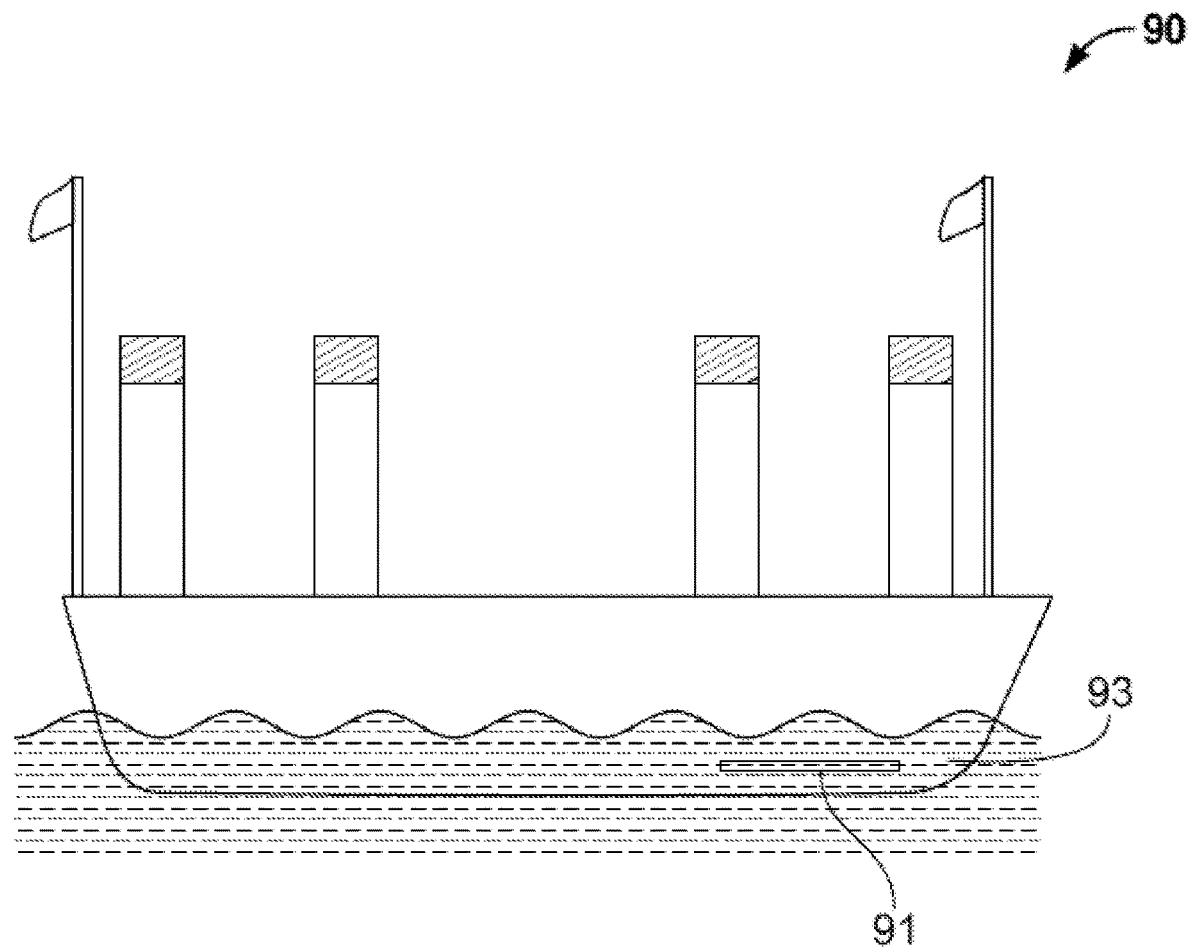
FIGS. 4A and 4B illustrate a method of making underwater repairs to a partially submerged vessel.
Figure 4B:
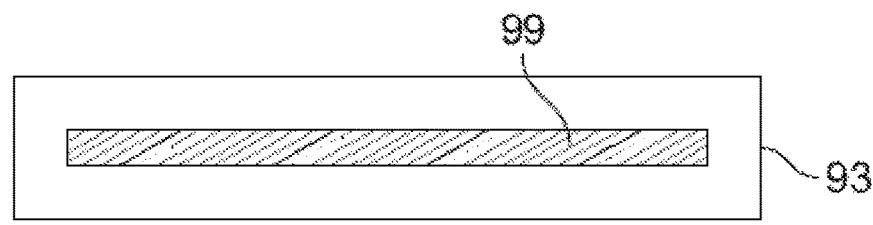

In other aspects, the paste may be used for underwater repairs, as shown schematically in FIGS. 4A and 4B. FIG. 4A shows a vessel 90 having a partially submerged hull 93. An aperture 91 is formed in the submerged portion 93, which may be an elongated gash as depicted in FIG. 4A. An appropriate quantity of paste 99 may be applied onto the submerged hull 93 covering the aperture 91 to create a watertight seal. The paste 99 may be applied to the outside surface of the hull 93, as shown in FIG. 4B. In some examples, another quantity of paste (not illustrated) may be applied to the inside surface of the hull 93 covering the aperture 91 to reinforce the watertight seal.

The paste may be applied to pipes and hoses, such as the ends of downspouts, gutters, PVC pipes, irrigation pipes, conduits, etc. to attach segments together in a watertight manner. After the paste is applied, the downspout or PVC pipe to which it is applied may be adhered to a fitting or junction element in a watertight manner.

In addition to the applications and benefits as set forth herein, there are benefits in these techniques as demonstrating the uses, the ease of the use, and the advantages of the rubberized adhesive pastes by each of these processes. For example, by making articles waterproof, the techniques described herein further provide benefits associated with avoiding contact with moisture, including making articles rust-resistant, mold-resistant, mildew-resistant, and the like.

The foregoing description should be considered illustrative rather than limiting. It should be recognized that various modifications can be made without departing from the spirit or scope of the invention as described and claimed herein.

What is claimed is:

1. A method of sealing an aperture in a wet surface consisting of applying a moisture-cure, hybrid synthetic resin paste directly onto the surface to cover the aperture while discharging water through the aperture and forming a watertight seal at a time of application.

2. The method of claim 1, wherein the surface is selected from the group consisting of plastic, metal, wood, stucco, plaster, brick, concrete, glass, rubber, tile, fiberglass, ceramic, porcelain, canvas, stone, and drywall.

3. The method of claim 1, wherein the surface is selected from the group consisting of a window, a door, siding, a roof, a pipe, and a gutter.

4. The method of claim 1, wherein the surface comprises a portion of a container.

5. The method of claim 4, wherein the container is a hot tub.

6. The method of claim 4, wherein the container is an aquarium.

7. The method of claim 4, wherein the container is a swimming pool.

8. The method of claim 1 wherein the wet surface comprises an underwater surface of a dock or waterborne vessel.

9. The method of claim 1 wherein the moisture-cure, hybrid synthetic resin paste is applied with a spatula.

10. A method of forming a leak and repairing the leak in a wooden barrel comprising:
    providing a wooden barrel or portion thereof, wherein the wooden barrel or portion thereof has an interior and is at least partially filled with water, and wherein the wooden barrel or portion thereof is not leaking the water;
    forming an aperture in an end of the wooden barrel or portion thereof, wherein the aperture is formed in the wooden barrel by cutting with a chainsaw, whereby water gushes from the interior and out through the aperture;
    applying a moisture-cure, hybrid synthetic resin paste onto the wooden barrel or portion thereof to cover the aperture and form a waterproof barrier wherein a surface area of the applied moisture-cure, hybrid synthetic resin paste is about 200% or more of a surface area of the aperture; and
    recirculating the water into the wooden barrel or portion thereof with the aperture formed in the end to maintain a substantially constant water level in the wooden barrel or portion thereof.

11. The method of claim 10, wherein the water is recirculated by a pump, and wherein the pump and the aperture are configured to maintain the substantially constant water level in the wooden barrel or portion thereof.

12. The method of claim 10 wherein the moisture-cure, hybrid synthetic resin paste is applied with a spatula.

13. The method of claim 1 wherein the moisture-cure, hybrid synthetic resin paste is applied with a caulk gun.

* * * * *